(12) United States Patent
Heinrich

(10) Patent No.: US 6,418,550 B1
(45) Date of Patent: Jul. 9, 2002

(54) LINE ERROR CHECKING CIRCUIT FOR AN ELECTRIC DATA TRANSMISSION SYSTEM

(76) Inventor: Peter Heinrich, Larchenstrasse 14, D-83533 Edling (DE)

( * ) Notice: Subject to any disclaimer, the term of this patent is extended or adjusted under 35 U.S.C. 154(b) by 0 days.

(21) Appl. No.: 09/431,681

(22) Filed: Nov. 1, 1999

(30) Foreign Application Priority Data

Nov. 3, 1998 (DE) .......................................... 198 50 672

(51) Int. Cl.[7] .......................... G06F 11/00; H03M 13/00
(52) U.S. Cl. ........................ 714/816; 714/819; 714/712
(58) Field of Search ................................. 714/816, 812, 714/712, 811, 819, 715; 341/94, 143

(56) References Cited

U.S. PATENT DOCUMENTS

| 4,785,453 A | * 11/1988 | Chandran et al. ............. 714/25 |
| 5,450,340 A | * 9/1995 | Nicolaidis .................... 708/531 |
| 5,822,514 A | * 10/1998 | Steinz et al. .................. 714/49 |

FOREIGN PATENT DOCUMENTS

EP     0 529 602 A2     3/1993

OTHER PUBLICATIONS

Kolarik, V. et al., "Designing Self–Exercising Analogue Checkers," *Proceedings of the 12th IEEE VLSI Test Symposium*, IEEE Comput. Soc., Cherry Hill, NJ, Apr. 25–28, 1994, pp. 252–257.

* cited by examiner

Primary Examiner—Christine T. Tu

(57) ABSTRACT

Error checking for an electric data transmission system for differential transmission of binary data pulses using two lines, in which the signals on both lines are differentiated each, the resulting differential signals and a reference signal are summed up to form a sum signal, the sum signal is compared with the reference signal on the one hand and the two differential signals are compared with the sum signal on the other hand, and error signals are produced from the result of these comparisons when line errors of a specific kind are present.

20 Claims, 7 Drawing Sheets

TABLE

| K1 | K2 | K3 | K4 | K5 | K6 | 0A | 0B | 0T | 0F | A1 | A2 | A3 | A4 | A5 | QI | QII | QIII | Error | No. | Type of condition | |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | NO | 1 | Rest (no edges) | Transition from dominant>recessive |
| 0 | 0 | 0 | 1 | 1 | 0 | 1 | 1 | 1 | 0 | 1 | 0 | 0 | 0 | 1 | 0 | 0 | 0 | NO | 2 | Edges | Transition from recessive<dominant |
| 0 | 0 | 1 | 0 | 0 | 1 | 0 | 0 | 1 | 0 | 1 | 0 | 0 | 1 | 0 | 1 | 0 | 0 | NO | 3 | Edges | B shorted or open |
| 1 | 0 | 1 | 0 | 0 | 0 | 1 | 0 | 1 | 1 | 1 | 1 | 0 | 1 | 1 | 1 | 0 | 0 | PI | 4 | pos. edge on A only | A shorted to B |
| 1 | 0 | 0 | 0 | 1 | 0 | 1 | 1 | 1 | 1 | 1 | 0 | 1 | 0 | 1 | 0 | 0 | 0 | PII | 5 | pos. edge on A and B | A shorted or open |
| 0 | 0 | 0 | 1 | 0 | 0 | 0 | 1 | 1 | 1 | 1 | 0 | 0 | 0 | 0 | 0 | 1 | 1 | PIII | 6 | pos. edge on B only | B shorted or open |
| 0 | 1 | 0 | 1 | 0 | 1 | 1 | 1 | 1 | 1 | 1 | 1 | 0 | 0 | 0 | 1 | 0 | 0 | NI | 7 | neg. edge on A only | A shorted to B |
| 0 | 1 | 1 | 0 | 1 | 0 | 1 | 0 | 1 | 1 | 1 | 0 | 1 | 0 | 0 | 0 | 1 | 0 | NII | 8 | neg. edge on A and B | A shorted to open |
| 1 | 1 | 0 | 0 | 0 | 1 | 0 | 1 | 1 | 1 | 1 | 0 | 0 | 1 | 0 | 0 | 0 | 1 | NIII | 9 | neg. edge on B only | |

Fig. 6

LINE ERROR CHECKING CIRCUIT FOR AN ELECTRIC DATA TRANSMISSION SYSTEM

TECHNICAL FIELD

The invention relates to a line error checking circuit for an electric data transmission system having a first line and a second line for differentially transmitting binary data pulses in such a manner that a first logic value of the data pulses has a high potential on the first line and a low potential on the second line associated therewith, and a second logic value of the data pulses has a low potential on the first line and a high potential on the second line associated therewith.

BACKGROUND OF THE INVENTION

A data transmission system usually includes a larger number of data locations that are interconnected by means of two lines and of which at least one is capable of operating both as transmitter and as receiver.

A first advantage of such differential transmission via two lines consists in that interference pulses reaching both lines in equal manner are eliminated in the differential assessment of decoding of the data pulses transmitted via the lines. A second advantage consists in that such a differentially operating data transmission system displays redundancy with respect to a number of line errors, so that error-free transmission thus is still possible if the two lines are shorted to each other if one of the two lines is open or if one of the two lines is shorted to a ground potential or a supply potential.

More detailed explanations in this respect can be found in DE 195 23 031 A1.

Such a differentially operating data transmission system can be a CAN system. The term CAN stands for Controller Area Network. Closer details in this respect can be found in the book "Controller Area Network: CAN" by Konrad Etschberger, Carl Hanser Publishing House 1994, ISBN No. 3-446-17596-2.

Such CAN systems are employed for example in the field of motor vehicles.

It is known from said DE 195 23 031 A1 to use three comparators in receiving locations of such a differentially operating data transmission system for decoding the transmitted data pulses, with a first one of said comparators comparing the potentials on the two lines with each other, a second one comparing the potential of the first line with a mean potential between low potential and high potential of the data transmission system, and a third one comparing the potential of the second line with the mean potential. The output signals of the three comparators are supplied to an error recognition circuit permitting the recognition of various line errors by way of the pattern of the signals delivered at the outputs of the three comparators. As long as no line error is detected, the output signal of the first decoder is used for decoding. In case a line error is detected, the output signal either of the second or third comparator is used for decoding.

If the error recognition is carried out on the basis of the output signals delivered by the three comparators, the recognition of the presence of a line error is available only after assessment of the line potentials by the comparators. Only thereafter can switching over to the output of the comparator take place that is suitable for the line condition ascertained. Due to the fact that, for reaction of the comparators, the potentials on the lines must change first until the switching threshold value of the particular comparator is reached, which usually is in the range of the middle between the low and the high potential of the data transmission system, evaluation is possible only after passage of a considerable part of the respective pulse edges.

Problems also arise due to the fact that, for example due to different capacitive loads of the two lines, the ascending pulse edge occurring on one line in case of a bit change and the descending pulse edge occurring on the other line may be of different edge steepness and also of different edge duration. The moments of time at which the second and third comparators react on a bit change are different in such a case.

In order to obtain sensible evaluation results, it would have to be ascertained within a predetermined time slot whether, after the time the second or third comparator reports a pulse edge, also the other one of these two comparators signals a pulse edge. Without this measure, the error recognition circuit, at the time at which first only one of these two comparators reports a pulse edge while the other one of these two comparators does not yet report a pulse edge, erroneously would assume that the line whose comparator does not yet signal a pulse edge is inflicted with an error.

For realizing the foregoing solution that makes use of a time slot, a counter would need to be employed. What is disadvantageous with this approach is on the one hand that a very fast counter is necessary and on the other hand that a predetermined time slot is capable of ascertaining only deviations of the mutually associated pulse edges on the two lines up to an extent corresponding to the selected time slot.

SUMMARY OF THE INVENTION

The disclosed embodiments of the present invention make available an error recognition possibility that safely renders possible error recognition directly after the edge beginning and thus safely permits a reaction to a line error already ascertained at this early moment of time.

The signals on the two lines are each differentiated and the resulting differential signals together are summed up with a reference signal. From a comparison of the sum signal with the reference signal on the one hand and a comparison of each of the two differential signals with the sum signal on the other hand, conclusions can be made as to whether the lines are error-free, whether one of the two lines is open or has a short-circuit or whether the two lines are shorted to each other. By way of the resulting comparison result, it is then possible during decoding of the data pulses transmitted to switch over to the output of that one of the comparators that leads to a correct decoding result for the line condition ascertained. Due to the fact that the differential signals and thus the sum signal are already present as of the respective edge beginning, an error assessment and, resulting therefrom, switching over to the output of the suitable comparator thus is already possible at this early moment of time. Due to the fact that also with asymmetric line behavior, for example due to different capacitive loads of the two lines, the pulse edges start simultaneously on both lines, the time slot problem does not arise in the method according to the invention.

In one embodiment, a capacitor is employed in each of the two lines for differentiating, and three resistors are employed for summing. The latter are connected together in a summing point, with a first one of these resistors connecting the summing point to one line, a second one of these resistors connecting the summing point to the other line, and the third resistor connecting the summing point to a reference voltage source. Differential voltages can be used as differential signals, which leads to a sum voltage, and a reference voltage can be employed as reference signal.

In another embodiment, comparators are provided for the comparison of the thus resulting sum voltage to the reference voltage on the one hand and the comparison of the thus resulting differential voltages of the two lines to the sum voltage, with the output signals of these comparators being evaluated by means of a logic circuit and being converted into assessment signals. If the respective assessment signal leads to the result that no line error has been detected, the output signal of the comparator comparing the potentials of the two lines is used for decoding. In case an assessment signal in the form of an error signal occurs, decoding is carried out using the output signal of one of the two comparators which each evaluate the potential of only one of the two lines.

The outputs of the comparators evaluating the line potentials can be fed to a multiplexer which, depending on the type of the respective assessment signal, connects a data output at which the decoded data are taken off, through either to the output of the comparator comparing the potentials of the two lines with each other, to the output of the comparator evaluating the potential of the first line, or to the output of the comparator evaluating the potential of the second line.

In another embodiment of the invention, the result of the comparison in which the two differential signals are each compared with the sum signal, is utilized for decoding the data transmitted. In this case, the decoding result is available already at the respective edge beginning. Thus, very fast decoding can be achieved with this embodiment. The comparator comparing the potentials of the two lines with each other is not necessary in this embodiment. When a multiplexer is used, the decoding result obtained in this embodiment is fed to that signal input of the multiplexer which is provided for connection to the output of the comparator interconnecting the two lines (this comparator being not provided in this embodiment).

BRIEF DESCRIPTION OF THE DRAWINGS

The disclosed embodiments as well as features and advantages of the invention will be elucidated hereinafter in more detail by way of embodiments shown in the drawings in which:

FIG. 6 shows a table of binary signals occurring at different locations of the embodiment shown in FIG. 5, along with an evaluation of the different signal patterns;

DETAILED DESCRIPTION OF THE INVENTION

Figure 1:
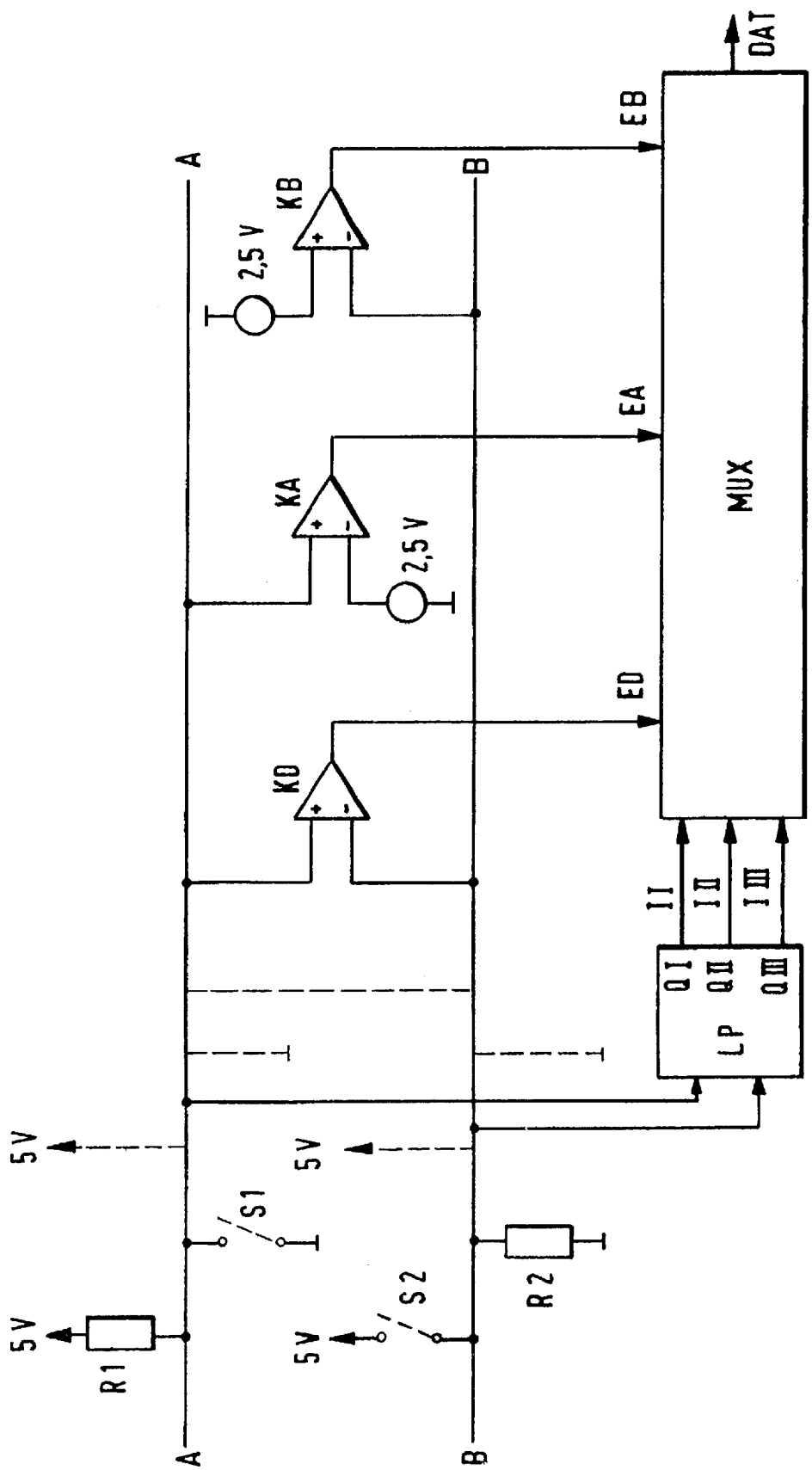
FIG. 1 shows part of a differentially operating data transmission system having a line error checking circuit according to the invention.

FIG. 1 shows one of several transmissive and receptive data locations of a differentially operating data transmission system comprising a line error checking circuit LP depicted as a circuit block. The data transmission system comprises two lines A and B via which data pulses are transmitted in opposite manner such that, with a first logic value, e.g., "1", a high potential of e.g., 5 V is produced on the first line A and a low potential of e.g., 0 V is produced on the second line B, and with a second logic value "0" of the data pulses, a low potential of 0 V is produced on the first line A and a high potential of 5 V is produced on the second line B. This is achieved by means of switches S1 and S2 connecting first line A to the low potential and second line B to the high potential, respectively. Both switches S1 and S2 are switched in synchronism such that they are both either non-conducting or conducting. When switches S1 and S2 are conducting, lines A and B are connected to the potentials applied to the switches. In case of non-conducting switches S1 and S2, the two lines A and B are connected to high potential via a resistor R1 and to low potential via a resistor R2, respectively.

Along lines A and B, there is disposed a multiplicity of such data locations with switches S1 and S2. If both switches S1 and S2 of a data location are conducting, the thus effected potentials on lines A and B are forced on all other data locations, irrespective of the switch positions of switches S1 and S2 thereof. A switching condition in which both switches S1 and S2 of a data location are conducting is therefore referred to as dominant. If the two switches S1 and S2 of a data location are in the non-conducting state, the resulting potential state on lines A and B can be overridden by switching switches S1 and S2 of another data location to the conducting state. The switching state of non-conducting switches S1 and S2 and the associated potential state on both lines A and B is thus referred to as recessive.

For decoding the respective data pulses transmitted and the potentials on lines A and B resulting therefrom, these potentials are compared with each other by means of a decoding comparator KD. The latter has a non-inverting input connected to line A and an inverting input connected to line B. KD thus subtracts the potential value on line B from the potential value on line A. On the assumption that the recessive state has a high potential on line A and a low potential on line B associated therewith and the dominant state has a low potential on line A and a high potential on line B associated therewith, a logic value "1" results at the output of decoding comparator KD in case of the recessive line condition and a logic value "0" results in case of the dominant line condition. KD thus is used to perform a bit evaluation of the respective line potentials on lines A and B. This means that a binary pulse sequence occurs at the output of KD.

FIG. 1 indicates in broken lines various line errors. Each of the two lines may be shorted in an erroneous manner towards high potential and towards low potential (e.g., system ground), respectively. However, it is possible that both lines are connected to each other in an erroneous manner.

There are line errors where KD still permits error-free, safe decoding. There are other line errors in which the output signal of KD no longer changes and thus is not suitable for decoding. For such cases, there are provided additional decoding comparators KA and KB comparing the potential on line A and the potential on line B, respectively, with a mean potential between high potential and low potential, which is, for example, in the range of 2.5 V. The output signal of KA delivers a safe, error-free decoded signal if line B is shorted to high or low potential, while line A however is error-free. In like manner, the output signal of KB can be used for safe decoding if line A is shorted or open while line B is error-free. In case both lines are shorted to each other, they have like potentials each, so that decoding is not possible with KD. In that case, the output signal of KA or of KB can be utilized for decoding.

A data output DAT at which the decoded data signal is available is connected to the outputs of decoding comparators KD, KA and KB via a multiplexer MUX, by means of which data output DAT can be connected through to the output of one of the three decoding comparators KD, KA and KB. To this end, multiplexer MUX has three signal inputs ED, EA and EB connected to the outputs of KD, KA and KB, respectively. Connecting through of DAT to ED, EA or EB takes place in accordance with an error signal pattern fed to multiplexer MUX via three switching signal inputs I I, I II and I III by a line error checking circuit LP connected on the input side to the two lines A and B.

In case an error signal pattern occurs at I I to I III that is interpreted as an error-free situation, the data output DAT of MUX is connected to data input ED. In case of occurrence of error signal patterns signaling a line error of line A or line B, DAT is connected through to EB or EA, respectively. If it is gatherable from the error signal pattern that a short-circuit between lines A and B is present, DAT is connected through either to EA or to EB. In case of data transmission systems having a high potential on line A associated with the recessive state and a high potential on line B associated with the dominant state, data output DAT preferably is connected through to EB in case of a short-circuit between lines A and B. This means, in this line error situation, the potential on line B, i.e., the output of decoding comparator KB, is used for decoding.

Figure 2:
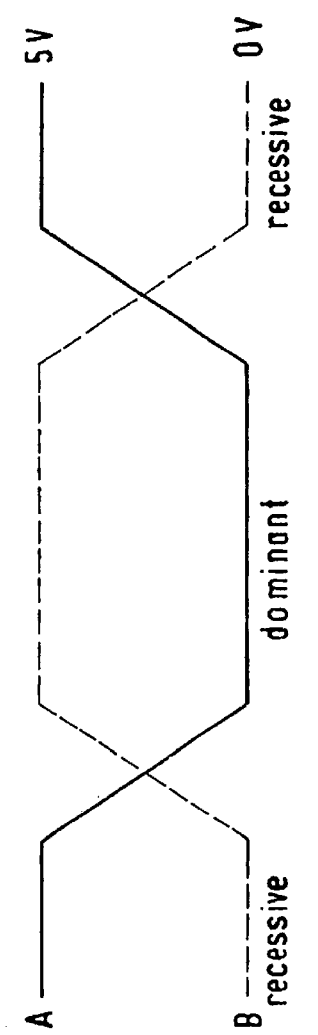
FIG. 2 shows a representation of a signal pattern on the two lines of a differentially operating data transmission system when both lines are intact.

FIG. 2 shows for the data transmission system in FIG. 1 potential patterns or curves on both two lines A and B for dominant and for recessive line conditions. Both during a dominant condition as well as during a recessive condition, constant potentials of e.g., 5 V and 0 V, respectively, occur on both lines A and B. This line condition is considered as a resting state in connection with the present invention. In the case of logic value changes in the data pulses transmitted via lines A and B, transition edges of the type shown in FIG. 2 occur. In the case of a transition from a recessive state to a dominant state, the potential on line A has an edge decreasing from 5 V to 0 V and the potential on line B has an edge changing from 0 V to 5 V. In case of a transition from a dominant state to a recessive state, oppositely directed edges occur on lines A and B.

In the illustration of FIG. 2, it is assumed that symmetric conditions are present for both lines. In practical application, this is often not true, for example if both lines are subjected to capacitive loads in different extent. In this case, the edges occurring on both lines during a change from the dominant state to the recessive state or vice versa may be of different steepness and/or different length.

Figure 3:
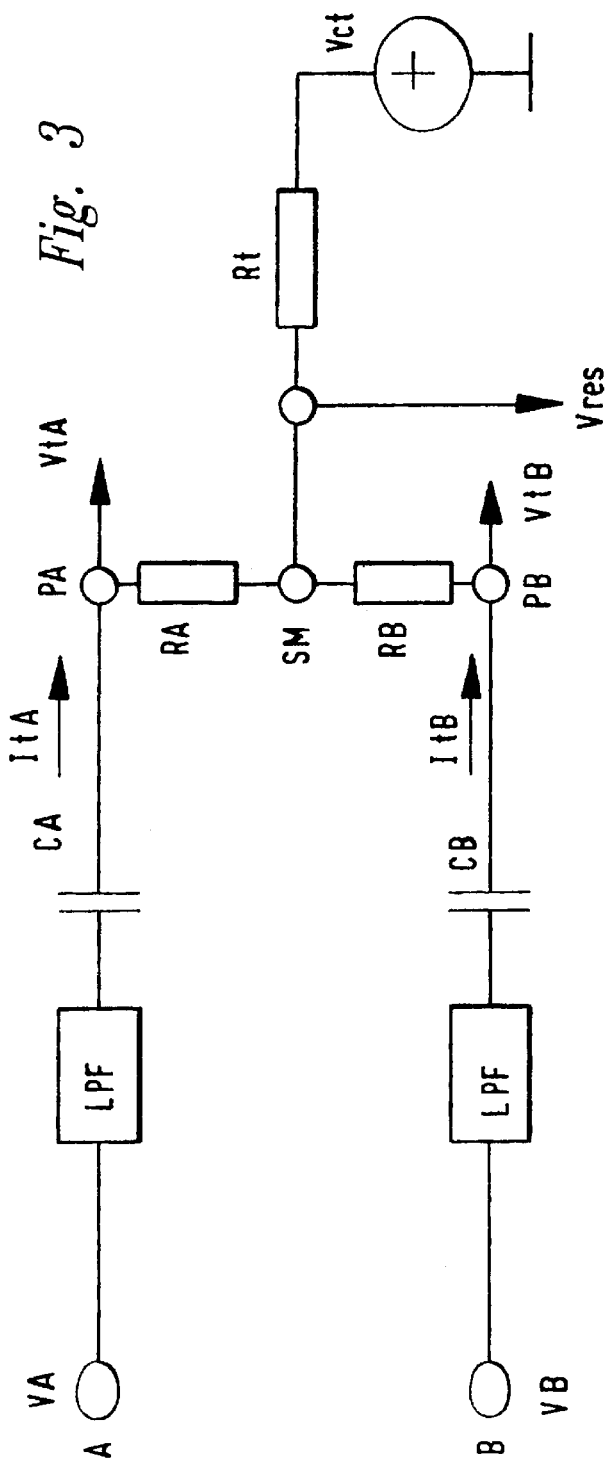
FIG. 3 shows an embodiment of a differentiating circuit and a summing circuit of the line error checking circuit according to the invention.

FIG. 3 shows an embodiment of the differentiating and summing part of a line error checking circuit according to the invention. A differentiating circuit has two differentiators which are constituted by a capacitor CA inserted into line A and a capacitor CB inserted into line B. CA and CB each have a low-pass filter LPF connected upstream thereof to suppress for instance electromagnetic interference signals.

Resistors RA, RB and Rt in FIG. 3 form a summing circuit. A summing circuit node SM is connected via resistor RA to a circuit node PA of line A, via resistor RB to a circuit node PB of line B and via resistor Rt to a reference voltage source REF which delivers a reference voltage Vct.

By virtue of the differentiating effect of CA and CB, differential currents IA and IB occur only during edges on lines A and B, respectively. During resting states of lines A and B, the differential currents IA and IB are thus 0.

The behavior of the circuit in FIG. 3 can be expressed as follows mathematically:

$$ItA = CA \cdot dVA/dt \quad (1)$$

$$ItB = CB \cdot dVB/dt \quad (2)$$

$$VtA = P1 \cdot dVA/dt \quad (3)$$

$$VtB = P2 \cdot dVB/dt \quad (4)$$

$$Vres = Vta + VtB + Vct \quad (5)$$

$$Vres = P1 \cdot dVA/dt + P2 \cdot dVB/dt \quad (6)$$

wherein:

VA=potential on line A

VB=potential on line B

ItA=differential current of capacitor CA

ItB=differential current of capacitor CB

P1=first constant

P2=second constant

Vres=resulting voltage at summing circuit node SM

If both lines A and B are in the state of rest, i.e., if both line potentials are constant, the differential currents ItA and ItB and thus the differential voltage VtA and VtB are each zero. This leads to $$Vres = Vct \quad (7)$$

If an ascending or positive edge occurs on a line, this leads to a positive differential current and to a corresponding positive differential voltage. A descending or negative edge results in a negative differential current and a corresponding negative differential voltage.

If in the error-free line condition, oppositely directed edges with like edge steepness occur simultaneously on both lines, differential currents ItA and ItB of like amount, but opposite direction result. Thus, two currents of like amount and opposite sign flow through Rt, so that the current flows thereof in resistor Rt cancel each other. This leads again to the relationship (7).

If one of the two lines is open or shorted to low or high potential, so that its potential remains permanently constant, the associated differential current and the associated differential voltage remain zero. Due to the fact that no current flows through associated resistor RA and RB, respectively, the associated circuit node PA and PB, respectively, remains on the sum voltage Vres of summing circuit node SM. Depending on whether an ascending or a descending edge is just present on the intact other line, a current flowing to reference voltage source REF or a current coming from reference voltage source REF, respectively, flows through resistor RA and RB, respectively, associated with this intact line. This is why sum voltage Vres in this case is higher or lower than Vct and the potential at circuit node PA or PB, respectively, is higher or lower than Vres.

These phenomena can be utilized for line condition checking or line error checking.

If Vres=Vct, the lines are in the state of rest or both lines just have oppositely directed pulse edges of like steepness. If Vres≠Vct, a behavior of both lines A and B is present which is different from the behavior depicted in FIG. 2, which hints at a line error. If one of the differential voltages VtA and VtB is equal to Vres and the other one different from Vres, one of the two lines A and B has failed because it is shorted or open, while the other line is intact. In this case it is possible to ascertain which one of the two lines has failed, on the basis of which one of circuit nodes PA and PB has a differential voltage equal to Vres and which one of these two circuit nodes has a potential that is greater or smaller than Vres. If Vres≠Vct, however, both differential voltages VtA and VtB are equal to Vres, from which follows that both lines are shorted to each other.

The observation that in the error-free condition of both lines in the range of edges Vres=Vct, however, holds only on the prerequisite that both lines display symmetric behavior of the type shown in FIG. 2. If the behavior of both lines is asymmetric, for example due to different capacitive loads, which causes edges of different edge steepness on both lines, differential currents ItA and ItB of different magnitude result, and thus Vres≠Vct, despite the fact that there are no line errors present. It is thus advisable to permit, in the comparison of Vres with Vct, Vres to denote a predetermined extent within a range on both sides of Vct, within which freedom from line errors is still assumed. Only if Vres leaves this range is the presence of a line error assumed in that case.

Figure 4:
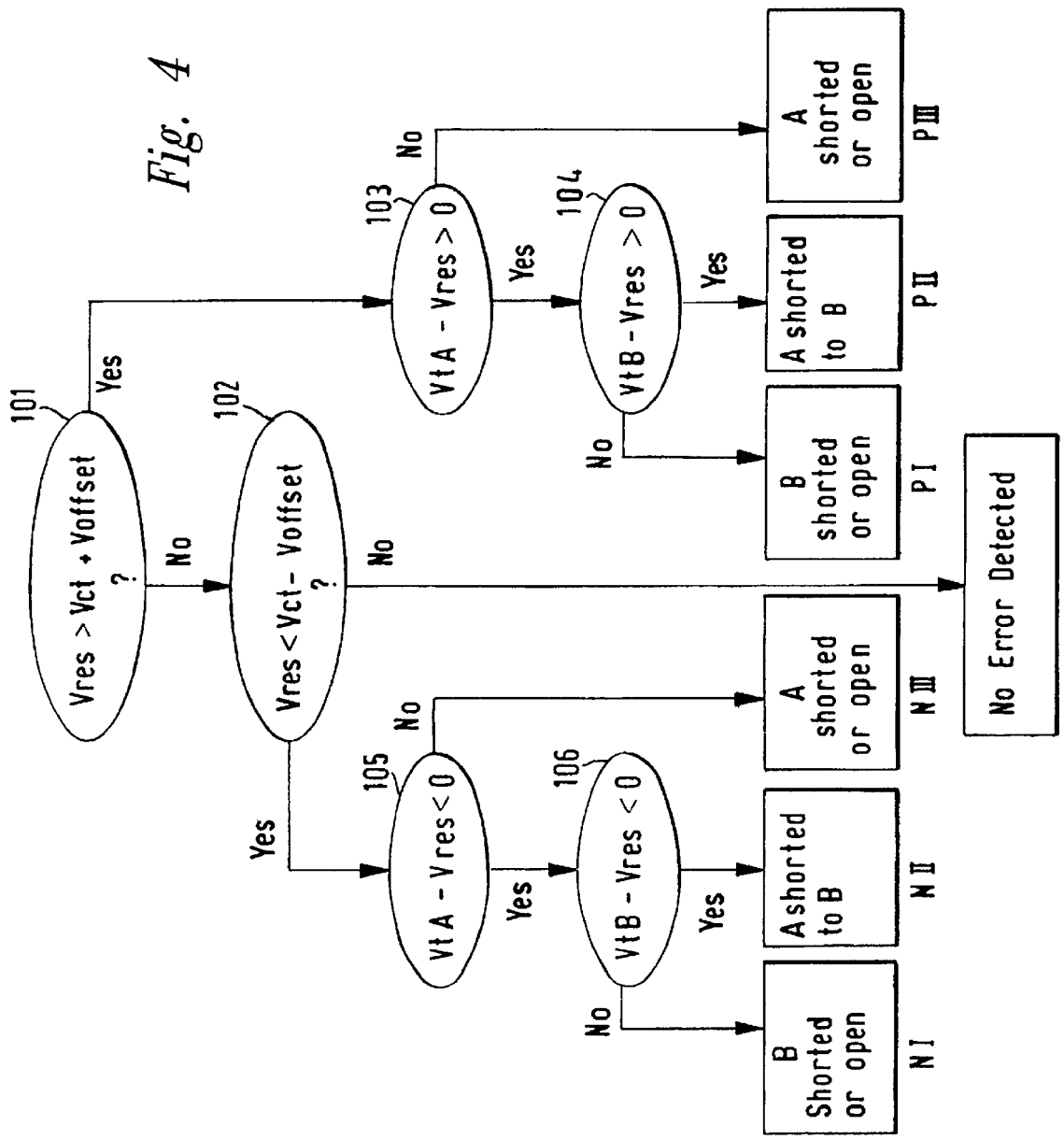
FIG. 4 shows an assessment scheme for the evaluation of the signals occurring in the embodiment of FIG. 3.

FIG. 4 shows a decision diagram which, in ascertaining whether or not line errors are present, permits asymmetries of both lines A and B to an extent defined by deviation voltages Voffset. The decision diagram in FIG. 4 provides for six decision levels 101 to 106, with reference being made to the statements in FIG. 4 with respect to the particular criterion of distinction.

If it is ascertained by way of decision criteria 101 and 102 that Vres remains within the bandwidth of Vct±Voffset both in positive and in negative direction, it is assumed that no line error is present. If this bandwidth is exceeded in positive direction, this is understood as a hint to the effect that a positive edge is present on at least one of the two lines. This leads to decision level 103. If the decision criterion of the latter leads to the statement that the differential voltage at circuit node PA is not greater than Vres, this means that a positive edge cannot be on line A, but only on line B. This points out that line A is open or displays a short-circuit to low or high potential. If however, VtA>Vres, this points out a positive edge on line A. By means of decision level 104, it is then ascertained whether a positive edge is present on line B as well. In case also VtB>Vres, this means that a positive edge appears both on line A and on line B. This means that lines A and B are shorted to each other. If in contrast thereto VtB is not greater than Vres, this indicates that a positive edge is present on line A only, but not on line B. This means that line B is open or has a short-circuit towards low or high potential.

If decision level 102 has shown that Vres is more negative than Vct by more than Voffset, this means that a negative edge must be present on at least one of the two lines A and B. If it is ascertained in this case by way of decision levels 105 and 106 that a negative edge is not present on A or not present on B, it is assumed that there is an open line or a short-circuit to low or high potential of lines A or B, respectively. However, if it turns out that both lines have a negative edge, it is again assumed that lines A and B are shorted to each other.

The decision tree according to FIG. 4, both in the decision branch detecting the occurrence of positive edges only, and in the decision branch detecting the occurrence of negative edges only, leads to three error types I to III. Error type I in both decision branches means that line B is shorted or open. Error type II means in both decision branches that both lines A and B are shorted to each other. Error type III means in both decision branches that line A is shorted or open.

Depending on whether the error has been ascertained by way of the right-hand decision branch 103 searching for positive edges or by way of the left-hand decision branch 105, 106 searching for negative edges, the error is designated in FIG. 1 as PI, PII, PIII and NI, NII, NIII, respectively.

Figure 5:
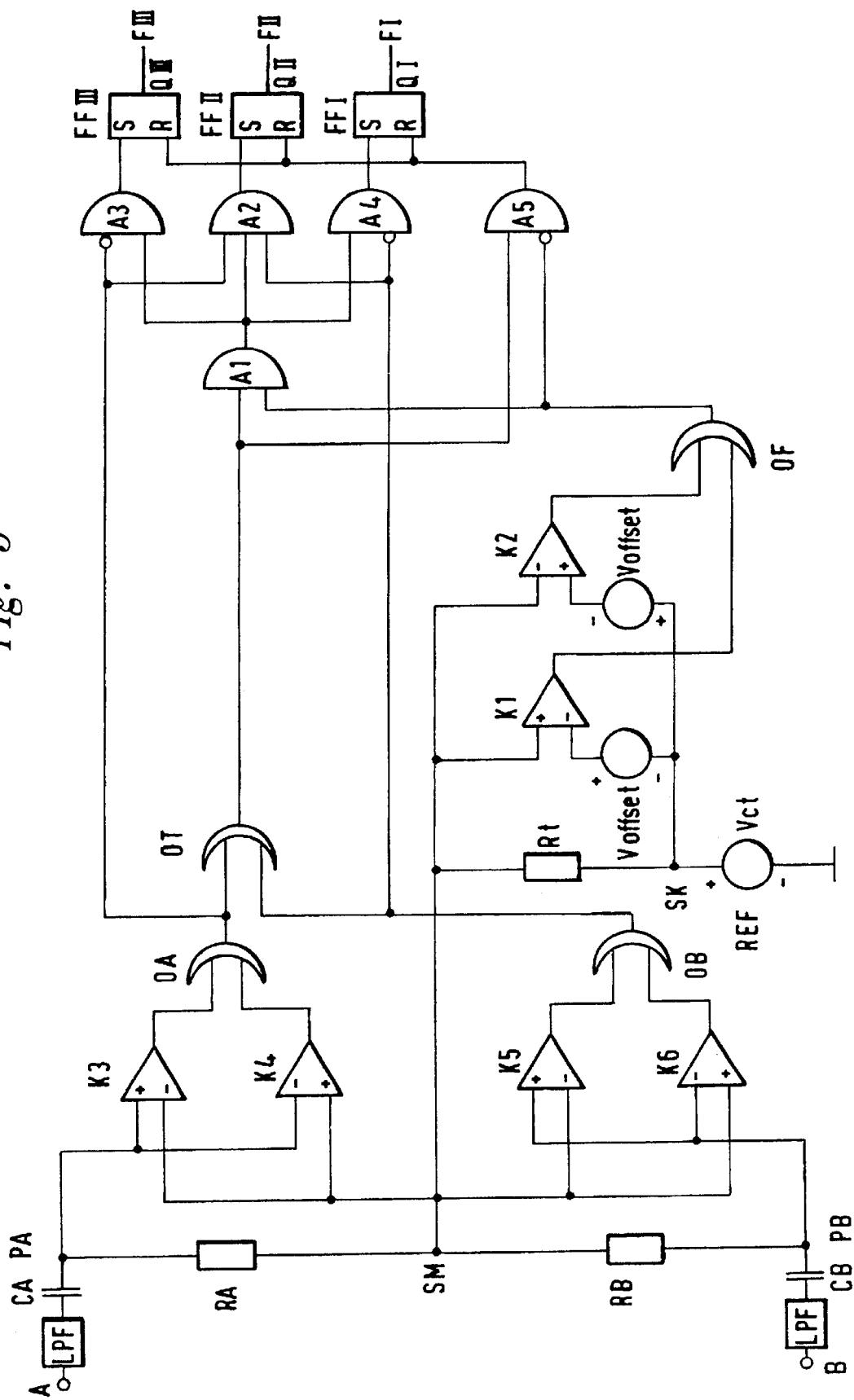
FIG. 5 shows a first embodiment of a line error checking circuit according to the invention.

An embodiment of a line error checking circuit according to the invention, which comprises the differentiating and summing circuit according to FIG. 3 and in addition thereto a circuit arrangement to carry out the decisions 101 to 106 of the decision tree of FIG. 4 is shown in FIG. 5. With regard to the circuit part identical with FIG. 3, reference is made to the preceding explanations relating to FIG. 3. In addition thereto, the line error checking circuit in FIG. 5 comprises six comparators K1 to K6, four OR circuits OA, OB, OT and OF, five AND circuits A1 to A5 and three RS flipflops FFI to FFIII in the circuit arrangement shown in FIG. 5. Comparators K1 and K2 are used to carry out the decisions of decision levels 101 and 102, respectively, of the decision tree of FIG. 4. Comparators K3 and K4 serve for implementing the decisions of decision levels 103 and 105 in FIG. 4. Comparators K5 and K6 are used to carry out the decisions of decision levels 104 and 106 in FIG. 4.

To this end, a non-inverting input and in inverting input of comparators K1 and K2 are connected to summing circuit node SM, whereas an inverting input of K1 and a non-inverting input of K2 are each connected, via an offset voltage source having the voltage value Voffset, to a positive terminal of reference voltage source RES, the other terminal of which is connected to low potential or ground. The two offset voltage sources have polarities as shown in FIG. 5.

The output signals of comparators K1 and K2 are subjected to an OR operation with the aid of OR circuit OF. The output signals of comparators K3 and K4 are subjected to an OR operation with the aid of OR circuit OA, whereas the output signals of comparators K5 and K6 are subjected to an OR operation by means of OR circuit OB. The output signals of OA and OB are subjected to an OR operation by means of OR circuit OT. An AND operation of the output signals of OT and OF is carried out by way of AND circuit A1. The output signals of OA, OB and A1 are subjected by means of A2 to an AND operation. A3 and A4 are used for subjecting the output signal of A1 as well as the negated output signal of OA and the negated output signal of OB, respectively, to an AND operation. A5 carries out an AND operation of the output signal of TO and the negated output signal of OF. While the output of A5 is connected to resetting inputs R of all three flipflops FFI to FFIII, setting inputs S of FFI to FFIII are connected to the output of A4, the output of A2 and the output of A3, respectively. Output terminals Q1 to Q3 deliver errors signals FI to FIII.

With regard to the exact interconnection of the individual circuit components of this line error checking circuit, reference is made to the representation in FIG. 5.

The behavior of the line error checking circuit will now be described by way of the table attached as FIG. 6. This table shows the logic values at the outputs of the FIG. 5 circuit components indicated in the uppermost line of this table, for nine conditions of lines A and B, as indicated in the column "Condition No.".

If the outputs of K1 and K2 display logic value "0" since the sum voltage Vres is within the range of Vct±Vct, the OR circuit OF also has a logic value "0", which points out that no line error is present. This circuit state is present for conditions No. 1 to 3, namely when both lines are in the state of rest or when edges in one direction or in the other direction are present on both lines in opposite directions. Whether the lines are in the state of rest or whether the error-free lines have edges can be seen from the output logic value of OR circuit OT. The latter always has an output logic value "0" when an edge is present on at least one of the two lines.

In the three conditions 1 to 3, the outputs Q1 to Q3 of all three flipflops FFI to FFIII have the logic value "0". This output signal pattern is interpreted as line condition without error.

A logic value "1" at the output of K1 with simultaneous occurrence of a logic value "0" at the output of K2 points out that a positive edge is present on at least one of the two lines A and B, however with no negative edge being present on any of the two lines. This holds for conditions 4 to 6. A logic value "0" at the output of K1 with simultaneous occurrence of a logic value "1" at the output of K2 indicates that a negative edge is present on at least one of both lines A and B, however with no positive edge being present on any of the two lines either. This holds for conditions 7 to 9.

On which line there is a positive edge in case of the positive conditions 4 to 6, is determined from the output signal pattern of comparators K3 and K5 which are responsible for ascertaining positive edges. If only the output of K3 has a logic value "1", a positive edge is present on line A only, so that line B thus must either be shorted or open (condition 4). If only the output of K5 has a logic value "1", a positive edge is present on line B only and line A must be shorted or open (condition 6). If both comparators K3 and K5 have a logic value "1" at their output (condition 5), a positive edge is present both on line A and on line B, so that a short-circuit must be present between lines A and B.

Corresponding considerations hold for conditions 7 to 9 for the output signal pattern of comparators K4 and K6 which are responsible for ascertaining negative edges.

While the output signal pattern of K1 and K2 can thus be used to determine whether or not the lines are error-free, the output signal pattern of K3 to K6 can be used to determine which line error type is present.

In all error conditions 4 to 9, the output of OR circuit OF has a logic value "1", which signals a line error. While it is possible to determine by way of the output signal of OT whether activity is present on the lines, i.e., whether an edge is present on at least one line, it is possible to read off from the output signal of OF whether a line condition is deemed error-free or an error-inflicted line condition is present.

By means of AND circuits A1 to A5, a logic operation is carried out which, upon presence of line conditions 1 to 3, leads to a logic value "0" at the outputs of all three flipflops FFI to FFIII, upon presence of line conditions 4 and 7, leads to a logic value "1"only at the output of FFI, upon presence of line conditions 5 and 8, leads to a logic value "1" only at the output of FII and, upon presence of line conditions 6 and 9, leads to a logic value "1" only at the output of FFIII. Thus, it is possible to conclude from the logic value pattern at the outputs Q1 to Q3 whether there is an error-free situation or whether a specific line error is present.

Looking again at FIG. 1, it is shown that switching signal inputs I I, I II and I III are connected to outputs QI, QII and QIII, respectively, of the line error checking circuit shown in FIG. 5. Multiplexer MUX has such an internal structure (not shown) that it connects data output DAT to signal input ED if QI to QIII each have the logic value "0", that DAT is connected through to signal input EA upon appearance of a logic value "1" at output Q1, and that DAT is connected through to signal input EB upon appearance of a logic value "1" at output QII or output QIII. During the error-free conditions 1 to 3, DAT thus is connected to the output of decoding comparator KD comparing the potentials of the two lines with each other. Upon occurrence of line conditions 4 and 7, i.e., if line A is error-free whereas line B is shorted or open, DAT is connected to the output of KA assessing the potential of line A only. In case of conditions 5, 6, 8, and 9, DAT is connected to the output of KB assessing the potential of line B only.

The output of AND circuit AS has a logic value "1" only if oppositely directed edges occur on both lines simultaneously. This line condition thus effects resetting of flipflops FI to FIII, if these are in the set condition since a line error has been detected before. In case of all line conditions 4 to 9 indicating a line error, however, a logic value "0" appears at the output of A5, so that there is thus no resetting of these flipflops. If a line error was present, which meanwhile has been eliminated or settled, resetting of flipflops FFI to FFIII thus takes place, so that multiplexer MUX is fed with a switching signal pattern which causes data output DAT to be connected through to signal input ED of multiplexer MUX.

Figure 7:
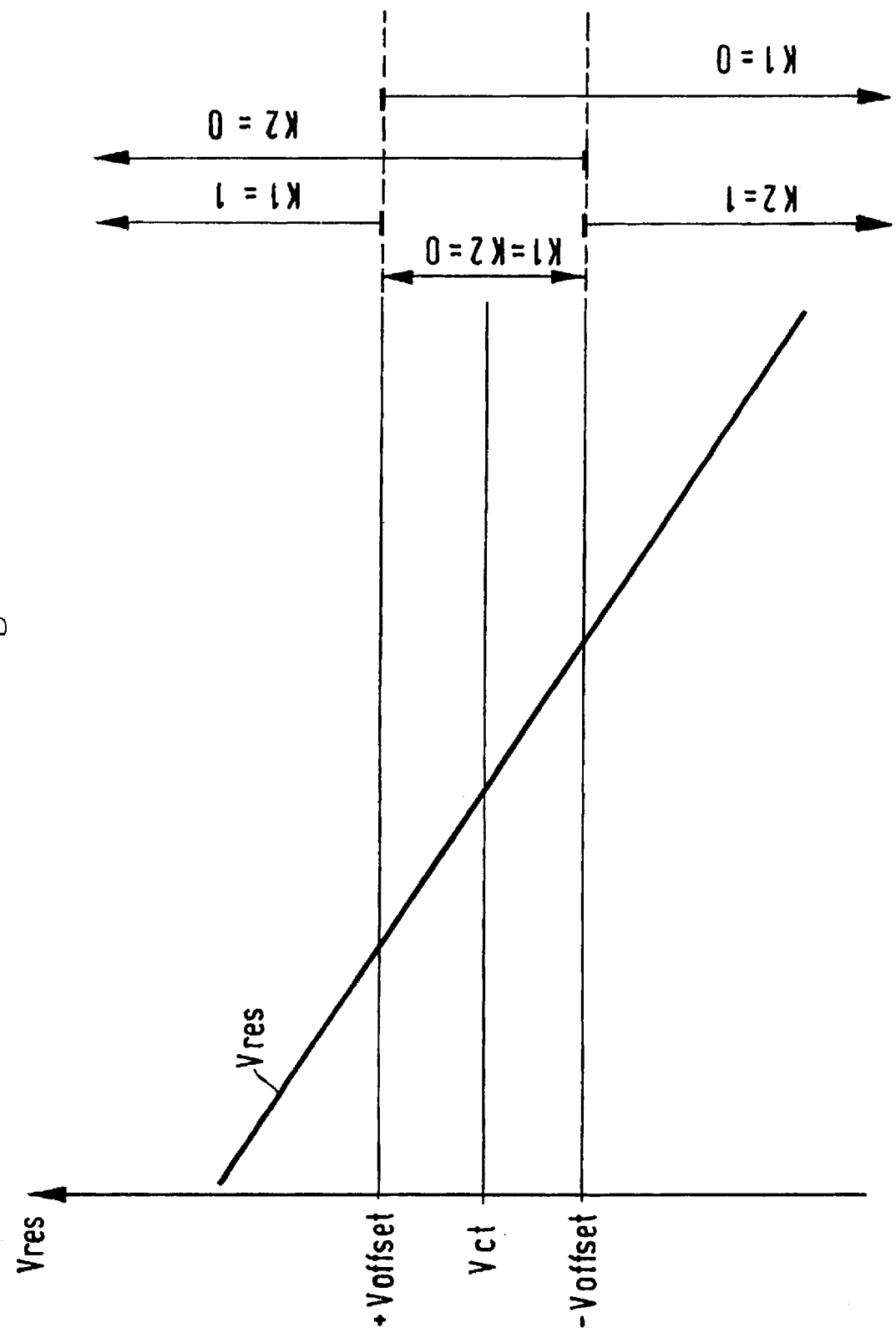
FIG. 7 shows a diagram illustrating the assessment of the sum voltage occurring in FIG. 5.

The assessment scheme with regard to a comparison of the sum voltage Vres with the reference voltage Vct and the resulting signals of comparators K1 and K2 are illustrated graphically in FIG. 7.

Figure 8:
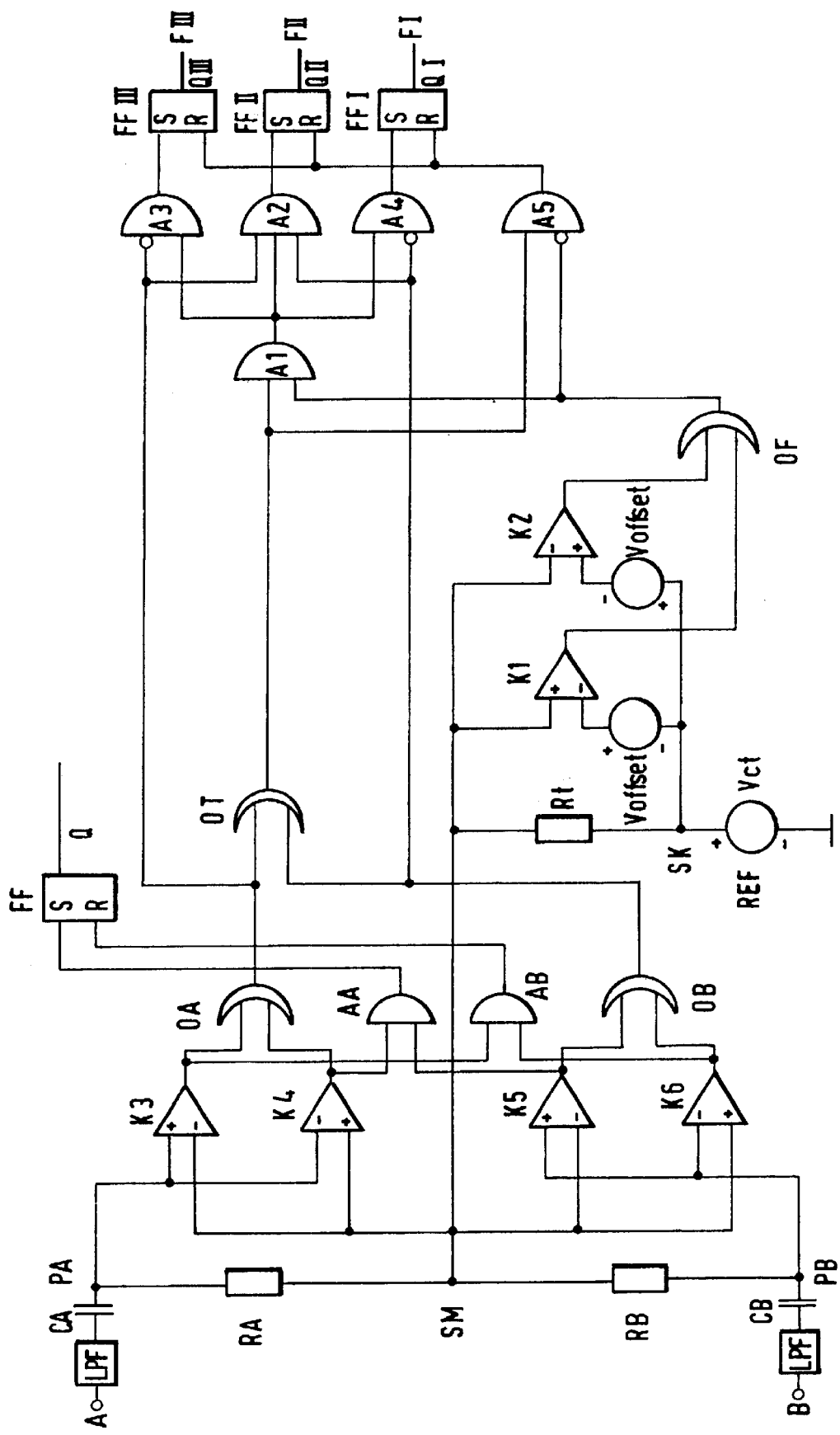
FIG. 8 shows a second embodiment of a line error checking circuit according to the invention.

FIG. 8 shows another embodiment of a line error checking circuit according to the invention, comprising the entire circuit shown in FIG. 5 and in addition a bit assessment circuit AA, AB, FF. As regards the part of this circuit that is identical with FIG. 5, reference is made to the preceding explanations concerning FIG. 5. Therefore, only the additional bit assessment circuit will be dealt with in the following.

An AND circuit AA causes an AND operation of the output signals of K4 and K5, while an AND circuit AB causes an AND operation of the output signals of K3 and K6. While a logic value "1" at the output of AA sets flipflop FF into the setting state, FF is reset by a logic value "1" at the output of AB. If, in case of intact lines A and B in the active line condition, oppositely directed edges always occur on both lines simultaneously, the situation always is such that either the outputs of K4 and K5 have logic value "1" and the outputs of K3 and K6 have logic value "0" (condition 2), or the outputs of K4 and KS have the logic value 1 and the outputs of K3 and K6 have the logic value "0". Thus, a logic value "1" appears at the output either of AA or at the output of AB, whereas logic value "0" appears at the output of the respective other AND circuits AA and AB. In case of successive potential transitions from dominant to recessive and recessive to dominant, logic values thus appear in alternating manner at the setting input S and at the resetting input R of flipflop FF, along with concomitant alternation of output Q of this flipflop FF between the logic values 1 and 0. At the Q output of FF there is thus the same information available as that obtained at the output of KD in the embodiment shown in FIG. 1. This means that in case of a data location equipped with a receiving circuit according to FIG. 8, the decoding comparator KD can be dispensed with and signal input ED of multiplexer MUX can be connected to output Q of flipflop FF in FIG. 8.

An advantage of the embodiment shown in FIG. 8 is that the bit evaluation is already available at the respective edge beginning, and thus earlier than it would be available at the output of decoding comparator KD. Decoded bit evaluation with the embodiment of FIG. 8 thus is possible at a very early moment of time of a bit change. The bit introduced with the respective edge change therefore is already known a long time before the time at which the potential values corresponding to this bit are only reached on lines A and B. This means, long before the potentials of a new bit have established themselves on lines A and B, such a bit is already assessed or decoded.

With all error conditions 4 to 9, a logic value "0" arises at the outputs of both AND circuits AA and AB independently of the type of the line error present, so that flipflop FF is no longer switched over and no logic value changes appear at the output of FF.

A receiving circuit of the type shown in FIG. 1, the line error checking circuit of which is designed according to FIG. 8, in the condition without line error renders possible a very early bit assessment or bit decoding already at the beginning of the respective edges and, in case of line errors, allows the recognition thereof also already at edge beginning, so that in time before the moment of time at which potential evaluations by means of decoding comparators aa and kb become possible, multiplexer mux may already have been switched over to that one of the two decoding comparators KA and KB the output signal of which permits safe decoding despite the line error involved.

What is claimed is:

1. A line error checking circuit for an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, said error checking circuit comprising:

a differentiating circuit that generates a first differential signal for the first line and a second differential signal for the second line, which correspond to a time derivation of a potential curve of the respective first and second line;

a reference signal source that provides a reference signal;

a summing circuit that generates a sum signal representing the sum of the two differential signals and the reference signal;

an assessment circuit that generates a no-error signal signaling a situation free from line errors is generated when the sum signal is equal to the reference signal or is within a predetermined range on both sides of the reference signal; and, when the no-error signal does not appear:

generates a first error signal signaling a line error of the first line is generated when the first differential signal is equal to the sum signal;

generates a second error signal signaling a short-circuit between both lines is generated when both differential signals are different from the sum signal; and generates a third error signal signaling a line error of the second line when the second differential signal is equal to the sum signal.

2. The line error checking circuit of claim 1, in which the differentiating circuit comprises a first differentiator in the form of a first capacitor connected into the first line and a second differentiator in the form of a second capacitor connected into the second line.

3. The line error checking circuit of claim 1, in which the reference signal source comprises a reference voltage source.

4. The line error checking circuit of claim 3, in which the summing circuit comprises a resistance circuit including a summing circuit node, a first resistor connected between the summing circuit node and the first differentiator, a second resistor connected between the summing circuit node and the second differentiator, and a third resistor connected between the summing circuit node and the reference voltage source.

5. The line error checking circuit of claim 1 in which the assessment circuit comprises a comparator circuit arrangement for assessing the sum signal in relation to the reference signal and for assessing the differential signals in relation to the sum signal, and a logic circuit for converting the signals delivered by the comparator circuit arrangement to the no-error signal and the respective error signal, respectively.

6. The line error checking circuit of claim 5, in which the comparator circuit arrangement comprises a first comparator circuit that compares the sum voltage with the reference voltage.

7. The line error checking circuit of claim 6, in which the first comparator circuit comprises a first comparator and a second comparator each having an inverting comparator input, a non-inverting comparator input, and a comparator output, the non-inverting comparator input of the first comparator and the inverting comparator input of second comparator being connected to the summing circuit node and the respective other comparator input being connected to a circuit node between the third resistor and the reference voltage source.

8. The line error checking circuit of claim 7, in which a first offset voltage source is connected between the inverting comparator input of the first comparator and the reference voltage source, and a second offset voltage source is connected between the non-inverting comparator input of the second comparator and the reference voltage source.

9. The line error checking circuit of claim 7 in which the comparator circuit arrangement comprises a second comparator circuit for comparing the two differential signals to the sum signal.

10. The line error checking circuit of claim 9, in which the second comparator circuit comprises third to sixth comparators each having an inverting comparator input, a non-inverting comparator input and a comparator output, the non-inverting comparator input of the third comparator and the inverting comparator input of the fourth comparator being connected to a circuit node between the first differentiator and the first resistor, the non-inverting comparator input of the fifth comparator and the inverting comparator input of the sixth comparator being connected to a circuit node between second differentiator and the second resistor and the respective other comparator inputs of these four comparators being connected to the summing circuit node.

11. The line error checking circuit of claim 10 in which the logic circuit comprises:

a first OR circuit linking the output signals of the first and second comparators;

a second OR circuit linking the output signals of the third and fourth comparator;

a third OR circuit linking the output signals of the fifth and sixth comparators;

a fourth OR circuit linking the output signals of the second and third OR circuit;

a first AND circuit linking the output signal of the first and fourth OR circuits;

a second AND circuit linking the output signals of the second OR circuit, the third OR circuit, and the first AND circuit;

a third AND circuit linking the output signals of the second OR circuit and the first AND circuit; and a fourth AND circuit linking the output signals of the third OR circuit and the first AND circuit.

12. The line error checking circuit of claim 11, in which the logic circuit comprises:
   a fifth AND circuit linking the output signals of first OR circuit and the fourth OR circuit;
   three RS flipflops each having a setting input, a resetting input, and an output, wherein
      the setting input of the first flipflop is connected to the output of the fourth AND circuit,
      the setting input of second flipflop is connected to the output of the second AND circuit,
      the setting input of the third flipflop is connected to the output of the third AND circuit;
      the resetting inputs of the three flipflops each is connected to the output of the fifth AND circuit;
      the first error signal is available at the output of the first flipflop; the second error signal is available at the output of the second flipflop; and the third error signal is available at the output of the third flipflop.

13. The line error checking circuit of claim 10, comprising a bit assessment circuit including:
   a first assessment AND circuit linking the output signals of the fourth and fifth comparators;
   a second assessment AND circuit linking the output signals of the third and sixth comparators; and
   an assessment flipflop having a setting input connected to an output of the first assessment AND circuit, a resetting input connected to an output of the second assessment AND circuit, and an output from which decoded data are available.

14. A receiving circuit for an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, comprising:
   a differentiating circuit that generates a first differential signal for the first line and a second differential signal for the second line, which correspond to a time derivation of a potential curve of the respective first and second;
   a reference signal source that provides a reference signal;
   a summing circuit that generates a sum signal representing the sum of the two differential signals and the reference signals;
   an assessment circuit that generates a no-error signal signaling a situation free from line errors if the sum signal is equal to the reference signal or is within a predetermined range on both sides of the reference signal; and, when a no-error signal does not appear:
   generates a first error signal signaling a line error of the first line is generated when the first differential signal is equal to the sum signal;
   generates a second error signal signaling a short circuit between both lines is generated when both the differential signals are different from the sum signal; and
   generates a third error signal signaling a line error of the second line when the second differential signal is equal to the sum signal;
   a decoding circuit having a first decoding comparator comparing the potentials of the two lines, a second decoding comparator comparing the potential of the first line to a mean voltage between the low potential and high potential, and a third decoding comparator comparing the potential of the second line to the mean potential; and
   a multiplexer circuit having three signal inputs, including a first one connected to an output of the first decoding comparator, a second one is connected to an output of the second decoding comparator, and a third one is connected to an output of the third decoding comparator, and having three switching signal inputs including a first one adapted to have the first error signal applied thereto, a second one is adapted to have the second error signal applied thereto, and a third one is adapted to have the third error signal applied thereto, and having a data output connected to the first signal input when none of the three error signals is present, connected to the second signal input when the first error signal appears at the first signal input, and connected to the third signal input when the second error signal appears at the second switching signal input or the third error signal appears at the third switching signal input.

15. A receiving circuit for an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, comprising:
   a differentiating circuit that generates a first differential signal for the first line and a second differential signal can be generated for the second line, which correspond to a time derivation of a potential curve of the respective first and second;
   a reference signal source that provides a reference signal can be provided;
   a summing circuit that generates a sum signal representing the sum of the two differential signals and the reference signals;
   an assessment circuit that generates a no-error signal signaling a situation free from line errors if the sum signal is equal to the reference signal or is within a predetermined range on both sides of the reference signal; and, when a no-error signal does not appear:
   generates a first error signal signaling a line error of the first line when the first differential signal is equal to the sum signal;
   generates a second error signal signaling a short circuit between both lines when both the differential signals are different from the sum signal; and
   generates a third error signal signaling a line error of the second line when the second differential signal is equal to the sum signal;
   a bit assessment circuit including a first assessment AND circuit linking the output signals of the fourth and fifth comparators, a second assessment AND circuit linking the output signals of the third and sixth comparators, and an assessment flipflop having a setting input connected to an output of the first assessment AND circuit, a resetting input connected to an output of the second assessment AND circuit, and an output from which the decoded data are available, with the bit assessment circuit thereof comprising a first decoding means for decoding the data transmitted via the lines;
   a second decoding means in the form of first comparison means comparing the potential of the first line with a mean potential between the potential and high potential;

a third decoding means in the form of a second comparison means comparing the potential of the second line with the mean potential;

a multiplexer circuit having three signal inputs, including a first one connected to the assessment output, a second one connected to an output of the first comparison means and a third one connected to an output of the second comparison means, and having three switching signal inputs including a first one adapted to have the first error signal applied thereto, a second one adapted to have the second error signal applied thereto, and a third one adapted to have the third error signal applied thereto, and having a data output connected to the first signal input when none of the three error signals is present, connected to the second signal input when the first error signal appears at the first signal input, and connected to the third signal input when the second error signal appears at the second switching signal input or the third error signal appears at third switching signal input.

16. A method for line error checking in an electric data transmission system having a first line and a second line for differentially transmitting binary data pulses in such a manner that a first logic value of the data pulses has a high potential on the first line and a low potential on the second line associated therewith and a second logic value of the data pulses has a low potential on the first line and a high potential on the second line associated therewith, said method comprising the following steps:

determining the signal on the first line and differentiating the signal on the second line;

summing the two differential signals obtained by differentiating and a reference signal;

a resulting sum signal is examined with respect to its value in comparison to the reference signal;

determining that no line error is present when the sum signal is equal to the reference signal or is within a predetermined range on both sides of the reference signal; and determining that a line error is present when the sum signal differs from the reference signal or is outside the predetermined range on both sides of the reference signal;

when the sum signal is not equal to the reference signal or is not within the predetermined range on both sides of the reference signal, comprising the two differential signals with the sum signal and evaluating the comparison results is carried out, in which a first error signal indicating a line error of the second line is generated when the differential signal belonging to the first line is different from the sum signal and the differential signal belonging to the second line is identical to the sum signal;

a second error signal indicating a short-circuit between the two lines is generated when both differential signals are greater or smaller than the sum signal;

and a third error signal indicating a line error of the first line is generated when the differential signal belonging to the first line is equal to the sum signal.

17. The method of claim 16, comprising:

receiving locations with a decoder means that decodes the data pulses transmitted and that can be switched over between decoding evaluation of the potentials on both lines and decoding evaluation of the potential of only one of the two lines, in which a line error checking operation according to claim 16 is carried out, and switching to decoding evaluation of the potentials of both lines is effected when no error signal has been detected, switching to decoding evaluation of the line potential of only the first line is effected if the first error signal is detected, switching to potential evaluation of only the first line or only the second line is effected when the second error signal is detected, and switching to potential evaluation of only the second line is effected if the third error signal is detected.

18. A line error checking circuit for an electric data transmission system having a first line and a second line, the circuit comprising:

a differentiating circuit configured to receive a first input signal from the first line and a second input signal from the second line and to generate a first differential signal from the first input signal and a second differential signal from the second input signal, the first and second differential signals each corresponding to a time derivation of the potential curve of the respective first and second input signals;

a summing circuit configured to receive the first and second differential signals and to receive a reference voltage signal and to output a sum signal representing the sum of the first and second differential signals and the reference voltage signal;

a comparator circuit configured to compare the sum signal to the reference voltage signal and the first and second differential signals in relation to the sum signal; and a logic circuit configured to receive output signals from the comparator circuit and to generate the following signals:

a no-error signal when the sum signal is equal to the reference voltage signal or when the sum signal is within a predetermined range above and below the reference voltage signals;

a first error signal corresponding to a line error of the first line when the first differential signal is equal to the sum signal;

a second error signal corresponding to a short circuit between the first line and the second line when the first and second differential signals are different from the sum signal; and a third error signal corresponding to a line error of the second line when the second differential signal is equal to the sum signal.

19. The circuit of claim 18, wherein the comparator circuit comprises a first comparator circuit configured to compare the sum voltage with the reference voltage, and a second comparator circuit configured to compare the first and second differential signals with the sum signal.

20. The circuit of claim 19, further comprising a bit assessment circuit coupled to the comparator circuit and configured to output decoded first and second input signal evaluation data prior to the establishment of the first and second input signals on the respective first and second input lines.

* * * * *

UNITED STATES PATENT AND TRADEMARK OFFICE
CERTIFICATE OF CORRECTION

PATENT NO. : 6,418,550 B1
DATED : July 9, 2002
INVENTOR(S) : Peter Heinrich

It is certified that error appears in the above-identified patent and that said Letters Patent is hereby corrected as shown below:

<u>Title page,</u>
Item [76], the Inventor data should read as -- Peter Heinrich, Rosenheim (DE) --.

Signed and Sealed this

Sixteenth Day of December, 2003

JAMES E. ROGAN
*Director of the United States Patent and Trademark Office*